United States Patent [19]

Sharples

[11] Patent Number: 5,165,057
[45] Date of Patent: Nov. 17, 1992

[54] RADIO RECEIVER ANTENNA SYSTEMS RESISTANT TO MULTIPLE PATH PROPAGATION FADING

[75] Inventor: Paul R. Sharples, Bolton, England

[73] Assignee: The General Electric Company, p.l.c., England

[21] Appl. No.: 645,700

[22] Filed: Jan. 25, 1991

[30] Foreign Application Priority Data

May 11, 1990 [GB] United Kingdom ............... 9010580

[51] Int. Cl.[5] ............................................. H01Q 1/02
[52] U.S. Cl. .................................... 343/704; 343/713; 455/273
[58] Field of Search ............... 343/704, 711, 712, 713; 455/292, 10, 273, 284, 173, 277

[56] References Cited

U.S. PATENT DOCUMENTS 4,761,826  8/1988  Kropielnicki et al. ............... 343/704

FOREIGN PATENT DOCUMENTS 0370746  5/1990  European Pat. Off. .

*Primary Examiner*—Rolf Hille
*Assistant Examiner*—Hoanganh Le
*Attorney, Agent, or Firm*—Kirschstein, Ottinger, Israel & Schiffmiller

[57] ABSTRACT

A radio receiver antenna system for overcoming multiple path propagation fading, includes an antenna arrangement which provides respectively at two terminals in response to a given transmitted signal, two signals at the frequency of the transmitted signal as are respectively produced by two antennas having different reception characteristics. A combining circuit is operative for producing an output at the frequency of the transmitted signal by combining the signals produced at said terminals in such manner that the output is significant for substantially all values of the relative phase of the two signals. The combining circuit includes an inductive winding to opposite ends of which the two signals are respectively applied. An output is derived from a tapping point on the winding or from a second winding, inductively coupled to said first-mentioned winding. A first output is preferably derived from a tapping point on the first-mentioned winding.

10 Claims, 1 Drawing Sheet

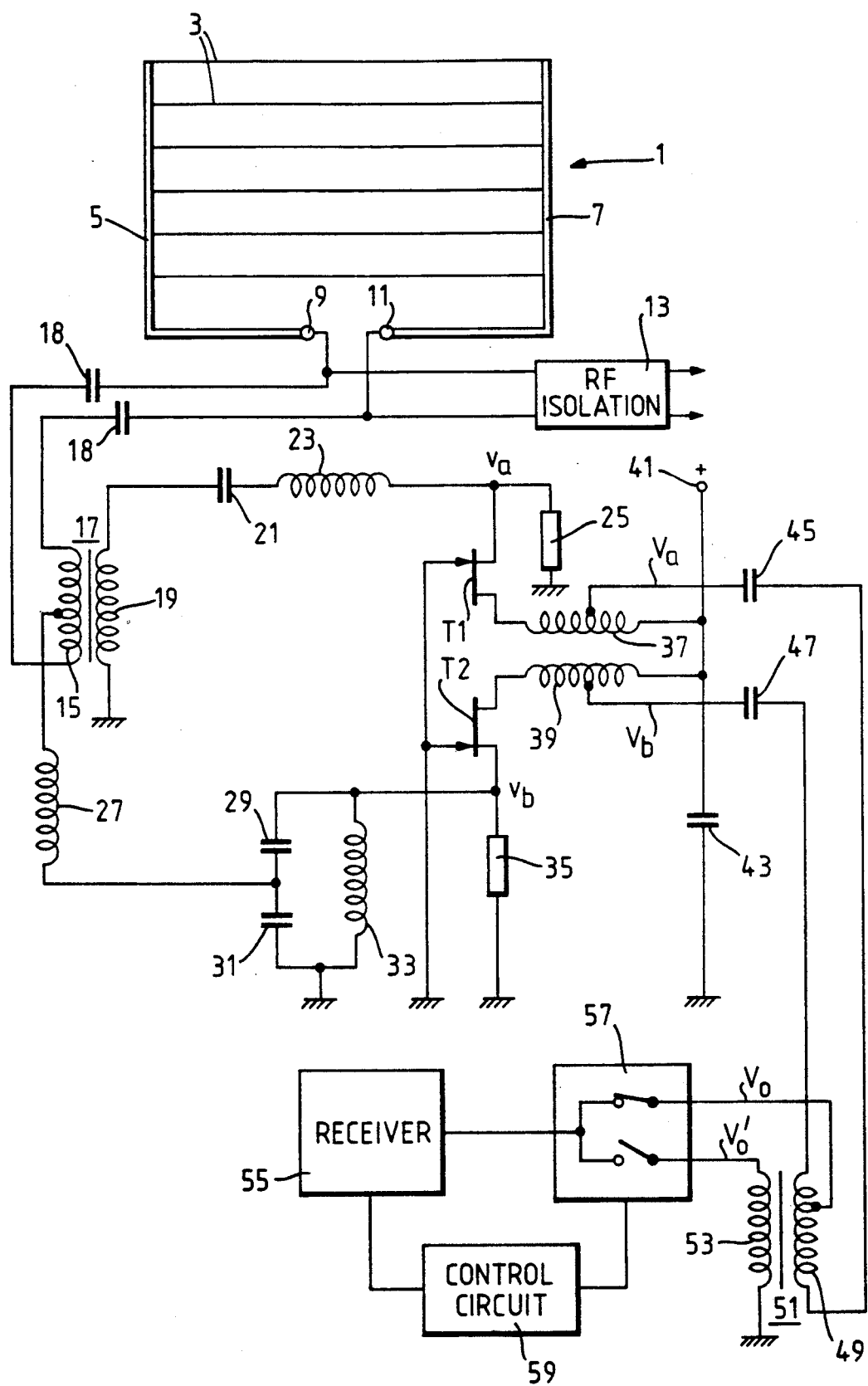

RADIO RECEIVER ANTENNA SYSTEMS RESISTANT TO MULTIPLE PATH PROPAGATION FADING

FIELD OF THE INVENTION

This invention relates to radio receiver antenna systems.

DESCRIPTION OF RELATED ART

A well-known problem with radio receivers is fading due to multiple path propagation. The problem arises particularly with mobile receivers when the receiver is in motion, especially when the receiver is for operation in the VHF band.

A known method of alleviating this problem is to use a so-called diversity reception technique. In this technique an antenna arrangement comprising two or more antennas having different reception characteristics, i.e. having receiving polar diagrams of different shape and/or orientation, is used, and the receiver is provided with a switching arrangement whereby the antenna producing the strongest signal at any one time is used as the receiver antenna. Instead of two or more antennas, a single antenna which operates in different modes may be used.

SUMMARY OF THE INVENTION

It is an object of the present invention to provide a novel form of radio receiver antenna system for alleviating multiple path propagation fading.

According to the present invention a radio receiver antenna system comprises: an antenna arrangement which provides respectively at two terminals, in response to a given transmitted signal, two signals at the frequency of the transmitted signal as are respectively produced by two antennas having different reception characteristics; and combining means for producing an output at the frequency of the transmitted signal by combining the signals produced at said terminals in such manner that said output is significant for substantially all values of the relative phase of said two signals; said combining means comprising an inductive winding to opposite ends of which said two signals are respectively applied, and means for deriving an output from a tapping point on the winding or from a second winding inductively coupled to said first-mentioned winding.

In one particular embodiment of the invention a first output is derived from a tapping point on said first-mentioned winding and a second output is derived from across a second winding inductively coupled to said first-mentioned winding; and switching means is provided for selectively connecting said first and second outputs to a radio receiver. In such a system said switching means may be operated under control of a signal derived from the receiver indicative of the strength of a signal supplied to the receiver from the antenna system. Alternatively, the switching means may be arranged to feed the first and second outputs to the receiver alternately.

BRIEF DESCRIPTION OF THE DRAWING

One radio receiver antenna system in accordance with the invention will now be described by way of example with reference to the accompanying drawing which is a circuit diagram of the system.

DETAILED DESCRIPTION OF THE PREFERRED EMBODIMENTS

The system is intended for use as a VHF antenna in a road vehicle and makes use of the rear window electric heater of the vehicle as an antenna.

Referring to the drawing, the antenna 1 comprises an array of parallel horizontal spaced resistance heating wires 3 mounted on the vehicle rear window (not shown) and joined at each end by a vertical conductor 5 or 7 of relatively low resistance also mounted on the window. The conductors 5 and 7 terminate below the wires 3 at terminals 9 and 11 respectively, positioned centrally of the heating wire array.

The terminals 9 and 11 are connected via a radio frequency isolation circuit 13 to the vehicle battery (not shown) for the supply of electric current to the wires 3 for heating purposes, as described for example in GB-A-1520030.

For use of the wires 3 and conductors 5 and 7 as a radio antenna, the terminals 9 and 11 are also connected to opposite ends of a primary winding 15 of a radio frequency transformer 17 via dc blocking capacitors 18. The transformer 17 has a secondary winding 19 which is grounded at one end and has its other end connected via a series resonant circuit comprising a capacitor 21 and an inductor 23 to the source of a field-effect transistor T1 whose source is also connected to ground via a resistor 25. The resonant circuit 21, 23 is tuned to the frequency band over which the antenna system is required to operate.

The primary winding 15 has a centre tap connected via an inductor 27 to the junction between two capacitors 29, 31 connected in series across an inductor 33. One end of the inductor 33 is grounded and the other end is connected to the source of a second transistor T2 whose source is also connected to ground via a resistor 35. The components 27, 29, 31 and 33 form a second resonance circuit tuned to the antenna system operating frequency band.

The gates of the transistors T1 and T2 are connected to ground and the drains of the transistors T1 and T2 are respectively connected via the windings of respective uncoupled autotransformers 37 and 39 to a terminal 41 at a positive potential with respect to ground to supply energising current for the transistors T1 and T2, the terminal 41 being grounded to radio frequencies via a capacitor 43.

Tapping points of the windings of autotransformers 37 and 39 are respectively connected via dc blocking capacitors 45 and 47 to opposite ends of a primary winding 49 of a transformer 51 which constitutes a signal combining means.

A first output Vo of the antenna system is derived from a tapping point on the winding 49 and a second output Vo' is derived from one end of a secondary winding 53 of the transformer 51 whose other end is grounded.

The outputs Vo and Vo' are supplied to the antenna terminal of a radio receiver 55 via a switching arrangement 57 whose operation is controlled by a control circuit 59 in dependence on a signal derived from the receiver 55, as further explained below.

In operation of the system, in response to a given transmitted signal, a first radio frequency signal $v_a$ appears between the source of transistor T1 and ground, and a second radio frequency signal $v_b$ appears between the source of transistor T2 and ground.

The signal $v_a$ arises from the antenna 1 acting in an unbalanced mode and the signal $v_b$ arises from the antenna acting in a balanced mode. Thus the signals $v_a$ and $v_b$ are respectively equivalent to those produced in response to a given transmitted signal by antennas of different reception characteristics and may be expected to vary in phase and amplitude differently as the vehicle moves. Thus the relative phase and relative amplitude of the signals vhd a and $v_b$, and hence of the replica voltages $V_a$ and $V_b$ which appear respectively at the tapping points on the windings of autotransformers 37 and 39 respectively, may be expected to change as the vehicle moves.

The inductances of the windings of autotransformers 37 and 39 with the output capacitances of transistors T1 and T2 respectively form resonant circuits tuned to the antenna system operating frequency and the positions of the tappings points on the windings of autotransformers 37 and 39 are chosen in dependence on the desired output impedance of the antenna system.

The position of the tapping point on the primary winding 49 of the transformer 51 is chosen so that the output voltage Vo at the tapping point is related both to the sum and to the difference of the voltages $V_a$ and $V_b$ at the tapping points of the autotransformers 37 and 39 such that $$Vo = A(V_a + V_b) + B(V_a - V_b)$$

where A and B are constants determined by the position of the tapping point on winding 49, and have values such that the voltage Vo is finite for all values of the relative phase and relative amplitude of $V_a$ and $V_b$. A suitable position for this tapping point is suitably found empirically, and will normally be such that the turns ratio of the parts of the winding 49 on opposite sides of the tapping point is non-unity, for example 2:1.

The position of the tapping point on winding 49 and the turns ratio of windings 49 and 53 are further chosen so that the second output voltage Vo' is related to the sum and to the difference of the voltages $V_a$ and $V_b$ in similar manner to output voltage Vo such that $$Vo' = A'(V_a + V_b) + B'(V_a - V_b)$$

where A' and B' are constants of different values to A and B so that the variation of Vo' is related to the variations of $V_a$ and $V_b$ as the vehicle moves in a different manner to Vo.

The switching arrangement 57 and control circuit 59 operate in accordance with any desired known diversity reception technique to utilise the outputs voltages Vo and Vo' in such a manner as to reduce fading of the signal applied to the antenna terminal of the receiver 55. For example, the receiver 55 may supply to the control circuit 59 a signal indicating the mean amplitude of a received signal and the control circuit 59 operate the switching arrangement 57 so as to supply to the receiver antenna terminal whichever of the two output voltages Vo and Vo' gives rise to the stronger received signal. Alternatively the control circuit 59 may be arranged to operate the switching arrangement 57 so as to supply the output voltages Vo and Vo' to the receiver antenna terminal alternately until the received signal exceeds a predetermined value. A third possibility is for the control circuit 59 to operate the switching arrangement 57 continuously so as to supply the output signals Vo and Vo' to the receiver antenna terminal alternately at a very rapid rate. A control signal derived from the receiver 55 is, of course, then not required.

It will be appreciated that whilst the antenna system according to the invention described above by way of example provides two outputs each of which is significant for substantially all values of the relative phase of the signals produced by two antennas of the system, and uses the two outputs in a diversity reception arrangement, in other systems in accordance with the invention only one such output (and no diversity reception arrangement) may be provided. Accordingly, the system shown in the drawing may be modified in accordance with the invention by dispensing with the tapping point on winding 49 and deriving an output for application to the receiver antenna terminal only from across the winding 53, or by dispensing with the winding 53 and deriving an output for application to the receiver antenna terminal only from the tapping point on winding 49.

It should be understood that whilst in the antenna system described above by way of example the antenna arrangement comprises a single antenna which operates in different modes to produce the combined signals, in other systems according to the invention the antenna arrangement may comprise two separate antennas having different reception characteristics.

It should be further understood that whilst in the antenna systems described above by way of example the antenna arrangement produces only two signals which are combined, in other systems according to the invention the antenna arrangement may produce more than two signals all of which are combined. For example, in a system wherein the antenna arrangement produces three signals, two of these signals may be combined in a first combining circuit, for example as shown in the accompanying drawing, and the combined signal then combined with the third signal by a second such combining circuit.

I claim:

1. A radio receiver antenna system comprising: a first antenna arrangement having means for responding to a given transmitted signal with a first reception characteristic to generate a first signal; a first terminal connected with said first antenna arrangement; a second antenna arrangement having means for responding to the same given transmitted signal with a second reception characteristic different from said first reception characteristic to generate a second signal; a second terminal connected with said second antenna arrangement; combining means connected with said first and second terminals for combining said first and second signals, and comprising a first winding having a first end connected to said first terminal and a second end, at the opposite end of said first winding from said first end, connected to said second terminal; a tapping point on said first winding; and means for deriving a first output for application to a radio receiver from said tapping point.

2. A system according to claim 1 wherein said first and second terminals are connected to said first and second ends of said first winding via respective autotransformers.

3. A system according to claim 1 wherein said tapping point is at a position such that the radio of turns of the winding on opposite sides of the tapping point is non-unity.

4. A system according to claim 3 wherein said ratio is substantially 2:1.

5. A system according to claim 1 wherein said combining means further includes a second winding inductively coupled to said first winding and means for deriving a second output from said second winding; and wherein switching means is provided for selectively connecting said first and second outputs to said radio receiver.

6. A system according to claim 5 wherein a signal having a strength is supplied to the receiver from the antenna system and said switching means is operated under control of a signal derived from said receiver indicative of said strength of said signal supplied to said receiver.

7. A system according to claim 5 wherein said switching means connects the first and second outputs to said receiver alternately.

8. A system according to claim 1 wherein said first and second antenna arrangements comprise a single antenna operating in different modes.

9. A system according to claim 11 wherein said first and second antenna arrangements comprise heating elements of an electrically heated window of a vehicle.

10. A radio receiver antenna system comprising: a first antenna arrangement having means for responding to a given transmitted signal with a first reception characteristic to generate a first signal; a first terminal connected with said first antenna arrangement; a second antenna arrangement having means for responding to the same given transmitted signal with a second reception characteristic different from said first reception characteristic to generate a second signal; a second terminal connected with said second antenna arrangement; combining means connected with said first and second terminals for combining said first and second signals, and comprising a first winding having a first end connected to said first terminal and a second end, at the opposite end of said first winding from said first end, connected to said second terminal, and a second winding inductively coupled to said first winding; and means for deriving an output from said second winding for application to a radio receiver.

* * * * *